B. FORD.
SECONDARY OR STORAGE BATTERY.
APPLICATION FILED NOV. 29, 1912.

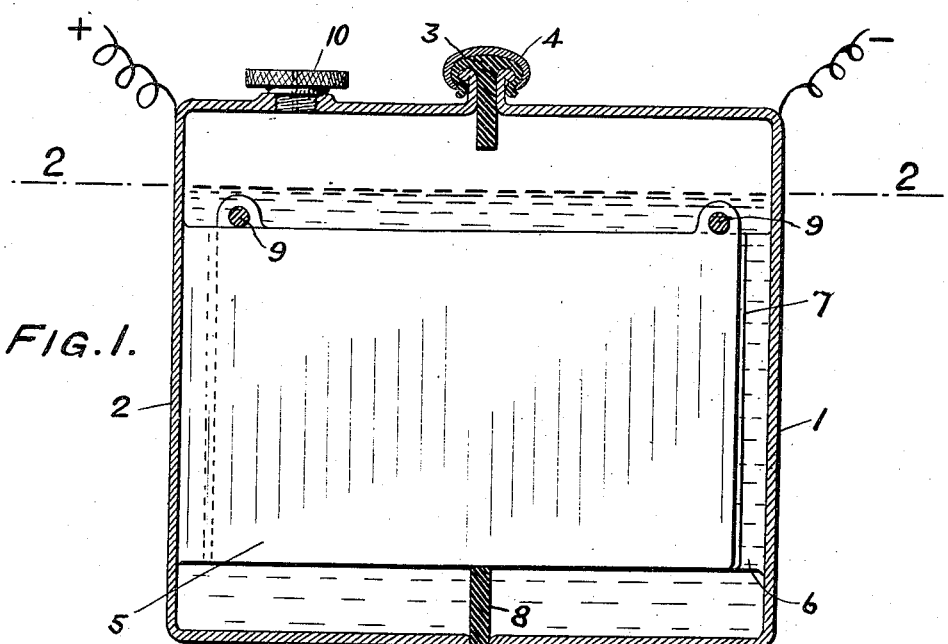
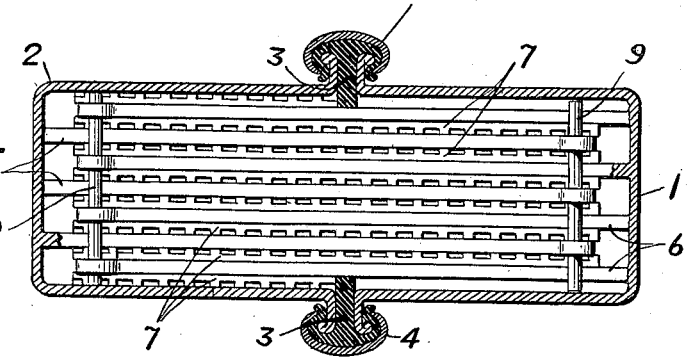
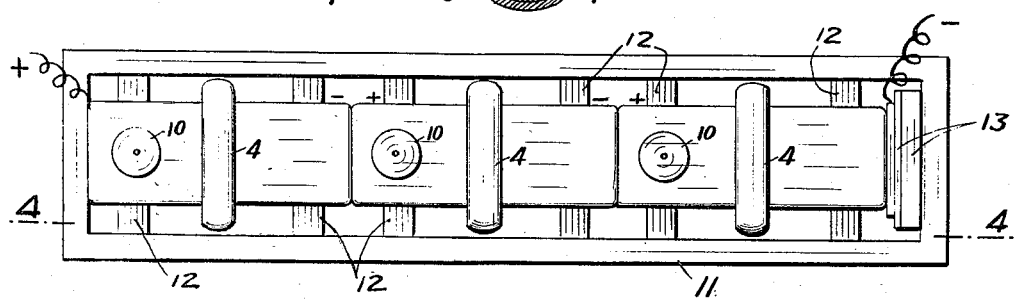

1,150,023.

Patented Aug. 17, 1915.
2 SHEETS—SHEET 2.

WITNESSES:
Rob't R Ketchel
Frank C French

INVENTOR
Bruce Ford
BY
Augustus B S Houghton
ATTORNEY.

UNITED STATES PATENT OFFICE.

BRUCE FORD, OF PHILADELPHIA, PENNSYLVANIA.

SECONDARY OR STORAGE BATTERY.

1,150,023.

Specification of Letters Patent.

Patented Aug. 17, 1915.

Application filed November 29, 1912. Serial No. 733,947.

*To all whom it may concern:*

Be it known that I, BRUCE FORD, a citizen of the United States, residing at the city of Philadelphia, in the county of Philadelphia and State of Pennsylvania, have invented certain new and useful Improvements in Secondary or Storage Batteries, of which the following is a specification.

The principal objects of the present invention are to improve and simplify the construction of secondary or storage batteries having regard more particularly to the terminal connections of the plates of each cell and of a battery of cells, and economize space and increase durability.

Other objects of the invention will appear from the following description which will be made in connection with the accompanying drawings in which are illustrated embodiments selected from other embodiments for the purpose of description.

Figure 5:
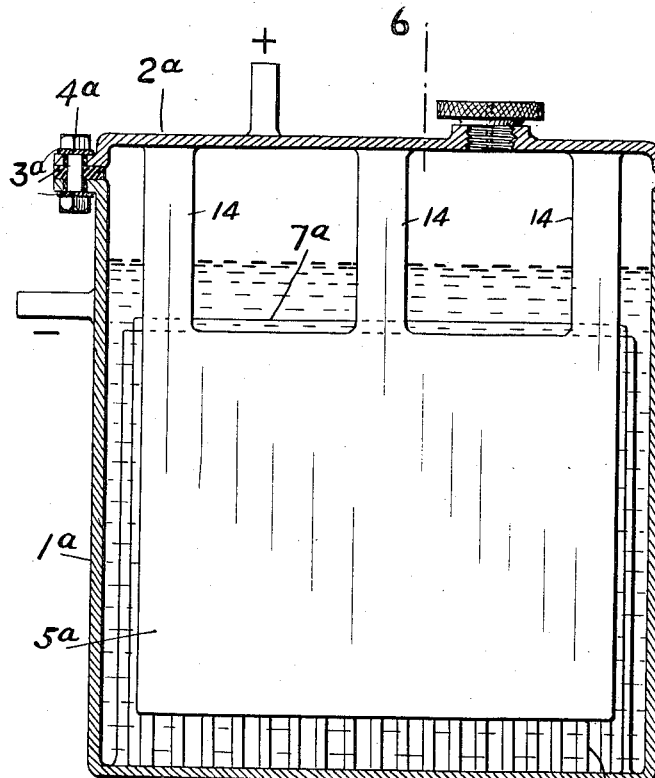
Figure 6:
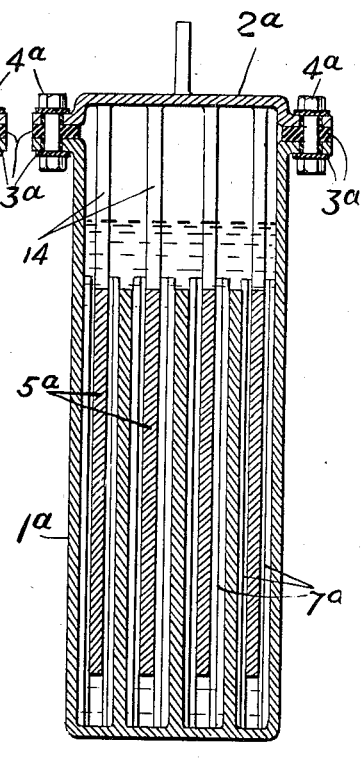
Figure 4:
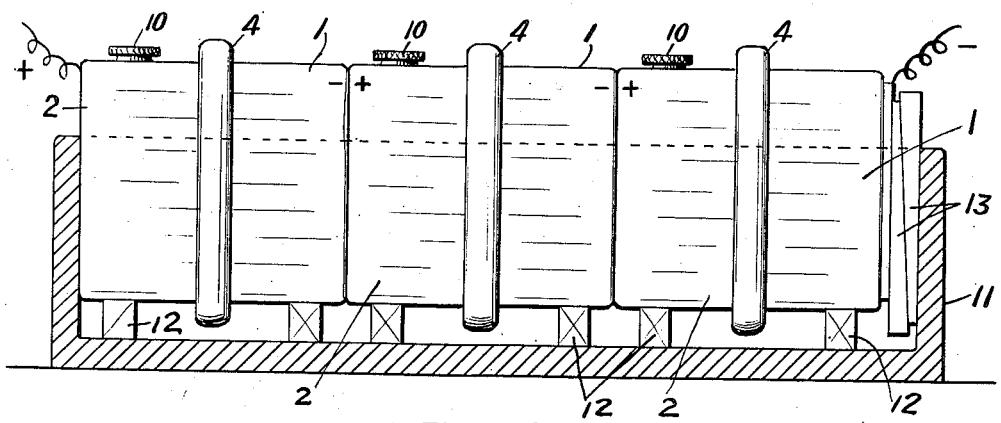

In the drawings Figure 1, is a sectional view of a storage battery cell embodying features of the invention. Fig. 2, is a sectional view taken on the line 2—2, of Fig. 1. Fig. 3, is a top or plan view of a number of cells electrically connected together. Fig. 4, is a side view of a number of cells electrically connected together, and Figs. 5 and 6, are respectively a transverse section illustrating a modification and a section on the line 6—6, of Fig. 5.

There is a sectional conducting container, the sections 1 and 2, of which are insulated from each other. The sections 1 and 2, of the container may consist of lead alloy or other appropriate material having or provided with the necessary conductivity. The sections are connected together but are insulated from each other.

3, is insulating material, as hard rubber.

4, is a metal band which may be crimped to place and which serves to connect the sections 1 and 2, and the insulating material in such a way that the parts are secured together while at the same time the sections 1 and 2, are insulated from each other. The electrodes or plates 5, of one sign are mechanically and electrically connected to the section 2, and electrodes 6, of the opposite sign are mechanically and electrically connected with the section 1. The connections between the electrodes and the sections can be made by burning, puddling, or in any convenient way and it provides a good electrical path. Burning is a method of making joints by melting the metal of the two portions to be joined into one union. Puddling involves this operation plus the use of additional metal.

Separators 7, are shown between the plates, and the insulation 3, is extended upward as at 8, to form a support for the plates. Insulating rods 9, are shown as resting upon one set of plates near their points of attachment to the container and passing through eyes in the other set of plates so as to support or help support the latter. These are matters which may or may not be used as required.

The container holds the necessary electrolyte and it may be provided with a filling opening and vented closure 10.

11, is a box or tray in which several of the described containers and their contents are arranged with the sections thereof of opposite sign in contact with each other so as to connect up the cells and provide terminals at the ends of the box or tray.

12, are blocks that may be employed between the containers in the bottom of the box, and 13, are wedges by means of which the containers can be held in proper contact with each other and firmly in the box. The box of course is of insulating material or at any rate the containers are insulated from it.

In the modification shown in Figs. 5 and 6, the sections 1ª and 2ª, are divided horizontally instead of vertically and they are insulated by the insulation 3ª. The parts are properly secured together by bolts 4ª, suitably bushed with insulated material. The plates 5ª, are shown as provided with lugs 14, by which they are connected with the section 2ª. 7ª, are separators.

It will be obvious that modifications may be made in details so that I do not desire to limit my invention to such matters, but

What I claim is:

1. The combination of sections of containers of opposite sign provided with flanges at their meeting edges, insulating material between and around said flanges, and a metal band arranged around the container and having crimped connection with the insulating material and across the flanges.

2. The combination of sections of containers of opposite sign provided with flanges at their meeting edges, insulating material between and around said flanges and extending inward to constitute a plate support, plates on said support, and means for clamping the flanges.

3. The combination of sections of containers of opposite sign provided with flanges at their meeting edges, fastening means for the flanges, and insulating material extending between the flanges and the fastening means, substantially as described.

In testimony whereof I have hereunto signed my name.

BRUCE FORD.

Witnesses:
 CLIFFORD K. CASSEL,
 FRANK E. FRENCH.